United States Patent
Oh et al.

(10) Patent No.: US 7,574,178 B2
(45) Date of Patent: *Aug. 11, 2009

(54) APPARATUS AND METHOD FOR CANCELLING INTERFERENCE IN A MOBILE COMMUNICATION SYSTEM USING MULTIPLE ANTENNAS

(75) Inventors: Hyun-Seok Oh, Incheon (KR); Hye-Jeong Lee, Suwon-si (KR); Hyun-Seok Yu, Seoul (KR); Gin-Kyu Choi, Seoul (KR); Yong-Suk Moon, Suwon (KR); Jeong-Won Lee, Suwon-si (KR); Hyun-Bae Lee, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 425 days.

This patent is subject to a terminal disclaimer.

(21) Appl. No.: 11/000,514

(22) Filed: Dec. 1, 2004

(65) Prior Publication Data

US 2005/0164658 A1    Jul. 28, 2005

(30) Foreign Application Priority Data

Dec. 2, 2003    (KR)    .................. 10-2003-0086941

(51) Int. Cl.
H03C 7/02    (2006.01)
(52) U.S. Cl. .................... 455/101; 455/226.1; 455/561; 375/148; 375/267; 375/347
(58) Field of Classification Search ................. 455/101, 455/226.1, 561; 375/148, 267, 347
See application file for complete search history.

(56) References Cited

U.S. PATENT DOCUMENTS

| | | | |
|---|---|---|---|
| 6,714,584 B1 * | 3/2004 | Ishii et al. | 375/148 |
| 6,745,050 B1 * | 6/2004 | Forsythe et al. | 455/561 |
| 6,785,341 B2 * | 8/2004 | Walton et al. | 375/267 |
| 7,151,808 B2 * | 12/2006 | Fujii et al. | 375/347 |
| 7,392,012 B2 * | 6/2008 | Oh et al. | 455/39 |
| 2005/0170802 A1 * | 8/2005 | Oh et al. | 455/226.1 |
| 2005/0232341 A1 * | 10/2005 | Oh et al. | 375/148 |

* cited by examiner

Primary Examiner—Sanh D Phu
(74) Attorney, Agent, or Firm—Roylance, Abrams, Berdo & Goodman, L.L.P.

(57) ABSTRACT

An apparatus and method for improving the performance of an error correction code against the effects of error waves in a Multi-Input Multi-Output (MIMO) communication system are provided. In a receiver of the MIMO communication system, a Minimum Mean Square Error (MMSE) receiver unit estimates transmitted signals from at least two paths using signals received at each of receive antennas, a signal deprocessor selects one of the estimated signals, stores the other estimated signal, assigns weighting values to the selected signal and a previous detected signal, combines the weighted signals, and detects transmitted data from the combined signal, a signal reproducer reproduces a transmitted signal from the detected transmitted data, and a subtractor updates the received signals by subtracting the reproduced transmitted signal from the received signals and provides them to the MMSE receiver unit.

16 Claims, 8 Drawing Sheets

APPARATUS AND METHOD FOR CANCELLING INTERFERENCE IN A MOBILE COMMUNICATION SYSTEM USING MULTIPLE ANTENNAS

PRIORITY

This application claims the benefit under 35 U.S.C. § 119 (a) to an application entitled "Apparatus and Method for Canceling Interference in a Mobile Communication System Using Multiple Antennas" filed in the Korean Intellectual Property Office on Dec. 2, 2003 and assigned Ser. No. 2003-86941, the contents of which are incorporated herein by reference.

BACKGROUND OF THE INVENTION

1. Field of the Invention

The present invention relates generally to a Multi-Input Multi-Output (MIMO) mobile communication system (i.e. a multiple-antenna mobile communication system). In particular, the present invention relates to an apparatus and method for improving the performance of an error correction code against the effects of error waves.

2. Description of the Related Art

Conventional mobile communication systems focus on voice service and rely on channel coding to overcome bad channel conditions. However, to meet demands for high-quality multimedia service, a future-generation wireless transmission technology is required which enables transmission of more data with less error probabilities at higher data rates. High-speed data transmission is important for a downlink that delivers a lot of data. Yet, in a mobile communication environment, fading, shadowing, propagation attenuation, noise, and interference decrease signal reliability considerably. Serious signal distortion results from multi-path fading, that is, the sum of signals that propagate in different paths and arrive at a receiving end with different phases and different strengths. The fading effect is a challenging problem to overcome in order to support high-speed data communications. Hence, many studies have been conducted on the issue. As an approach to overcoming fading, a Multi-Input Multi-Output (MIMO) scheme using multiple transmit/receive antennas was proposed. According to the MIMO scheme, data is transmitted simultaneously using multiple antennas of a transmitter and a receiver. This allows transmission of a large volume of data without increasing a transmission bandwidth.

Figure 1:
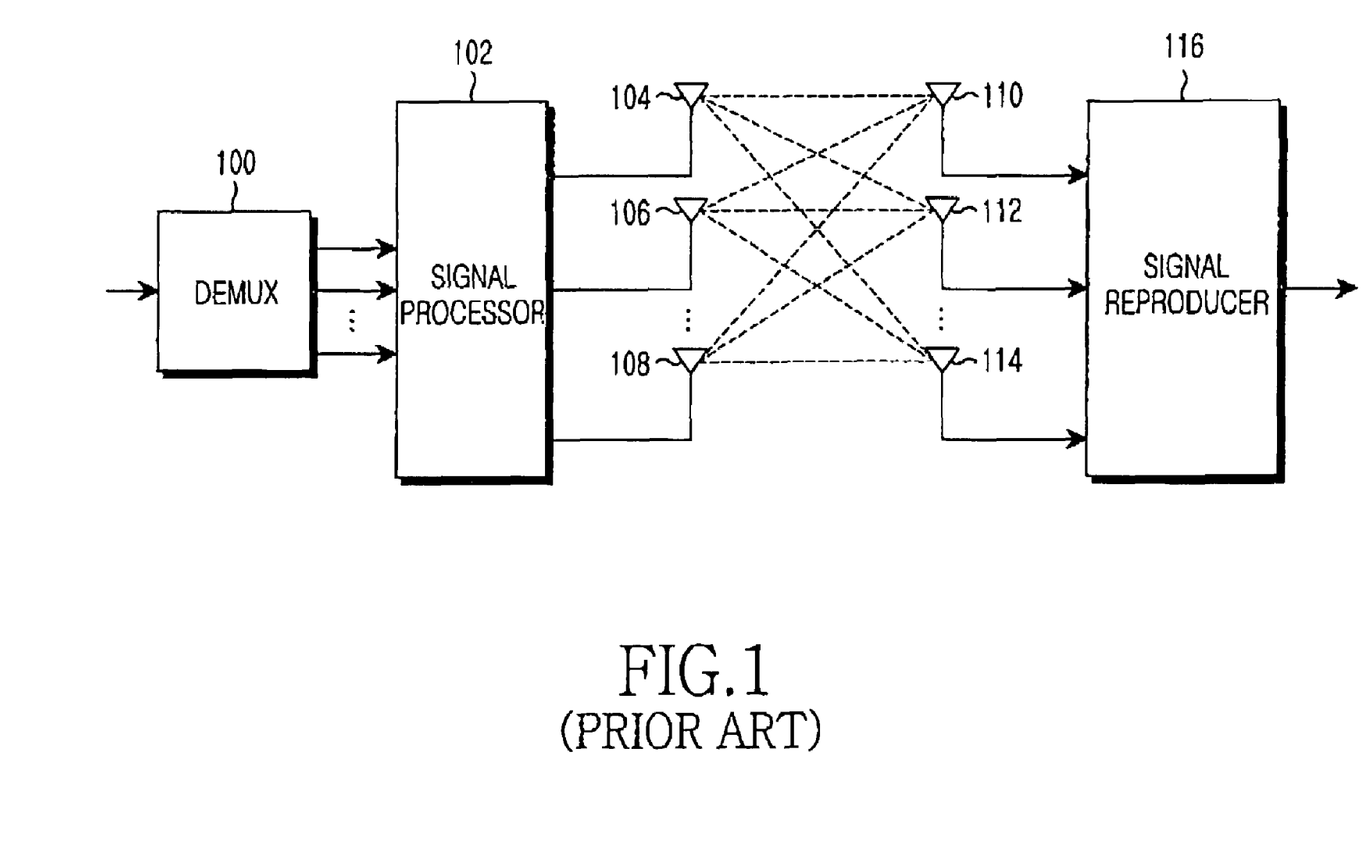
FIG. 1 is a block diagram of a conventional Multi-Input Multi-Output (MIMO) mobile communication system.

FIG. 1 is a block diagram of a conventional MIMO system. As illustrated in FIG. 1, a transmitter comprises a demultiplexer (DEMUX) 100, a signal processor 102, and transmit antennas 104 to 108. A receiver comprises receive antennas 110 to 114 and a signal processor 116. Only components required to describe the principle of MIMO are shown. A plurality of channels are established between the transmit antennas 104 to 108 and the receive antennas 110 to 114.

Referring to FIG. 1, the DEMUX 100 demultiplexes an input data stream into as many data streams as the number of the transmit antennas 104 to 108. Specifically, the DEMUX 100 produces as many duplicates from one user data stream as the number of transmit antennas 104 to 108. The redundant transmission of one user data stream through multiple antennas reduces the probability of errors in the user data stream and, as a result, increases its reception reliability. Alternatively, the DEMUX 100 receives as many data streams as the number of transmit antennas 104 to 108 and outputs them correspondingly to the transmit antennas 104 to 108.

The signal processor 102 processes the demultiplexed user data streams in a predetermined manner and transmits the data streams through the transmit antennas 104 to 108. The receive antennas 110 to 114 receive the user data streams from the transmit antennas 104 to 108. That is, the receive antenna 110 receives the user data streams from the transmit antennas 104 to 108 and the receive antenna 112 also receives the user data streams from the transmit antennas 104 to 108. The receive antenna 114 also receives the user data streams from the transmit antennas 104 to 108. The signal processor 116 processes the user data streams received from the receive antennas 110 to 114 in a predetermined manner, for example, by coding and modulation.

There are largely two MIMO systems: Bell Labs Layered Space-Time (BLAST) and Per-Antenna Rate Control (PARC).

In BLAST, a transmitter demultiplexes a user data stream to as many data streams as the number of transmit antennas and the transmit antennas use the same data rate. BLAST is further branched into Diagonal BLAST (DBLAST), Vertical BLAST (VBLAST) and Horizontal BLAST (HBLAST). DBLAST applies a predetermined block coding to a user data stream to be transmitted through each transmit antenna. Despite having a high efficiency, DBLAST has the shortcoming of having a high implementation complexity. VBLAST uses an independent coding to a user data stream to be transmitted through each transmit antenna. VBLAST implementation requires that the number of receive antennas is equal to or greater than that of transmit antennas. A VBLAST receiver uses Maximum Likelihood Detection (MLD). MLD chooses symbols with least errors among all possible symbols transmittable through all transmit antennas, to thereby significantly increase performance. However, computation volume increases with the number of transmit antennas and thus implementation complexity is increased.

PARC allocates a different data rate according to the channel state of each transmit antenna. The channel state can be evaluated by means of Signal to Interference and Noise Ratio (SINR).

Figure 2:
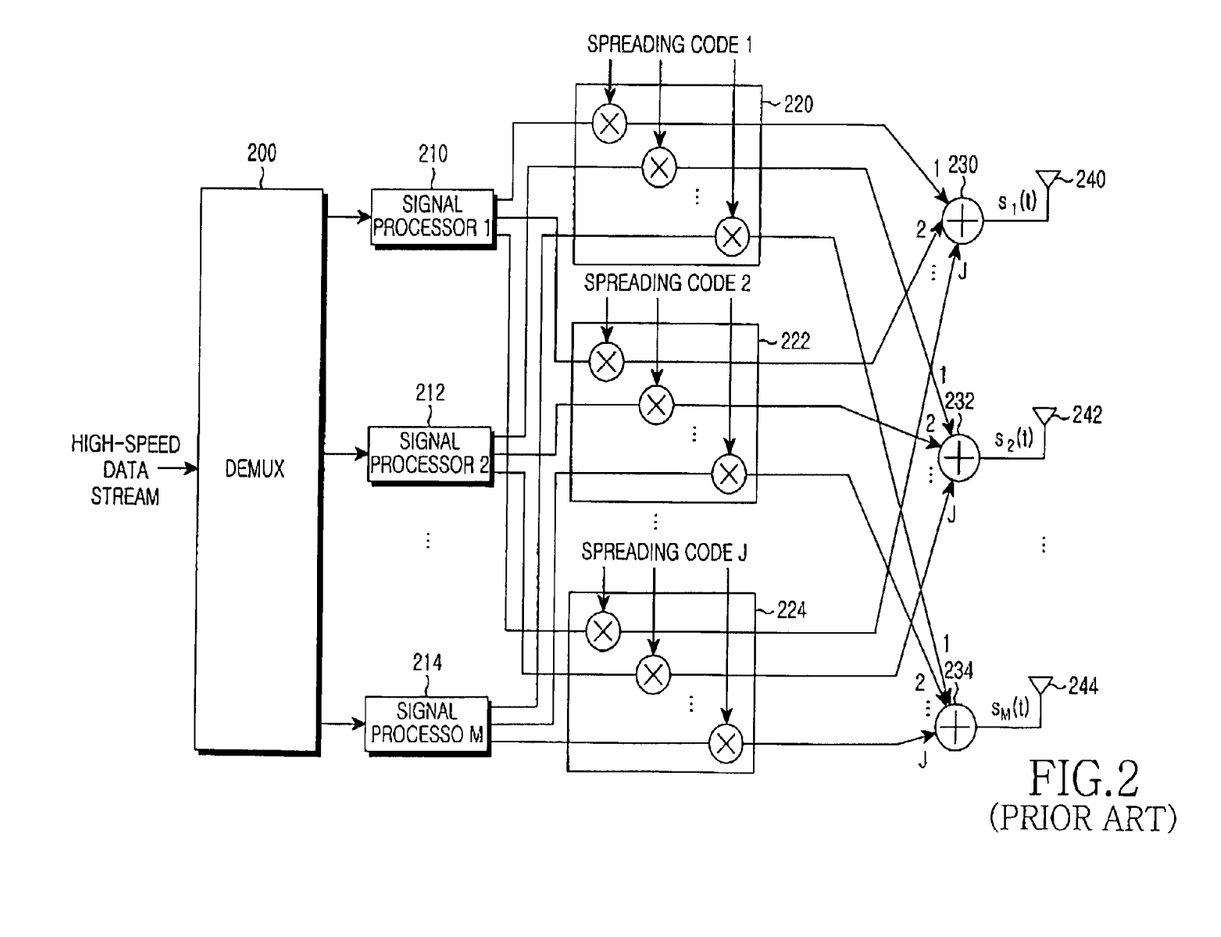
FIG. 2 is a block diagram of a transmitter in the conventional MIMO mobile communication system.

FIG. 2 is a block diagram of a transmitter in a MIMO system using PARC. The system illustrated in FIG. 2 can transmit J×M user data streams simultaneously using J spreading codes and M transmit antennas.

Referring to FIG. 2, a user data stream is provided to a DEMUX 200. The DEMUX 200 segments the user data stream to J data units according to the number of transmit antennas. Signal processors 210 to 214 each process the J user data streams in a predetermined method.

The signal processors 210 to 214 encode, interleave and modulate the received user data streams using data rates allocated to them and output the processed user data streams to first to J-th spreaders 220 to 224. More specifically, the J processed data streams output from the signal processor 210 are provided respectively to the first to J-th spreaders 220 to 224. In the same manner, the J processed data streams output from each of the signal processors 212 to 214 are provided respectively to the first to J-th spreaders 220 to 224.

The spreaders 220 to 224 use different spreading codes. The first spreader 220 spreads the received user data streams with the same spreading code 1. The second spreader 222 spreads the received user data streams with the same spreading code 2. The J-th spreader 224 spreads the received user data streams with the same spreading code J.

The spread signals are provided to adders 230 to 234. Notably, the user data streams processed in the same signal processor, that is, the user data streams processed by the same coding, interleaving and modulation are provided to the same adder. That is, the user data streams from the signal processor 210 are fed to the adder 230, the user data streams from the signal processor 212 are fed to the adder 232, and the user data streams from the signal processor 214 are fed to the adder 234.

The adder 230 adds the received data streams and the sum is additionally processed, for example, by scrambling and frequency upconversion. Then the processed signal $s_1(t)$ is transmitted on a radio channel through a first transmit antenna 240. Because the additional signal processing is beyond the scope of the present invention, its detailed description is not provided here. After additional processing, the sum from the adder 232 is transmitted as a signal $s_2(t)$ on a radio channel through a second transmit antenna 242. The sum from the adder 234 is transmitted as a signal $s_M(t)$ after additional processing, on a radio channel through an M-th transmit antenna 244.

Figure 3:
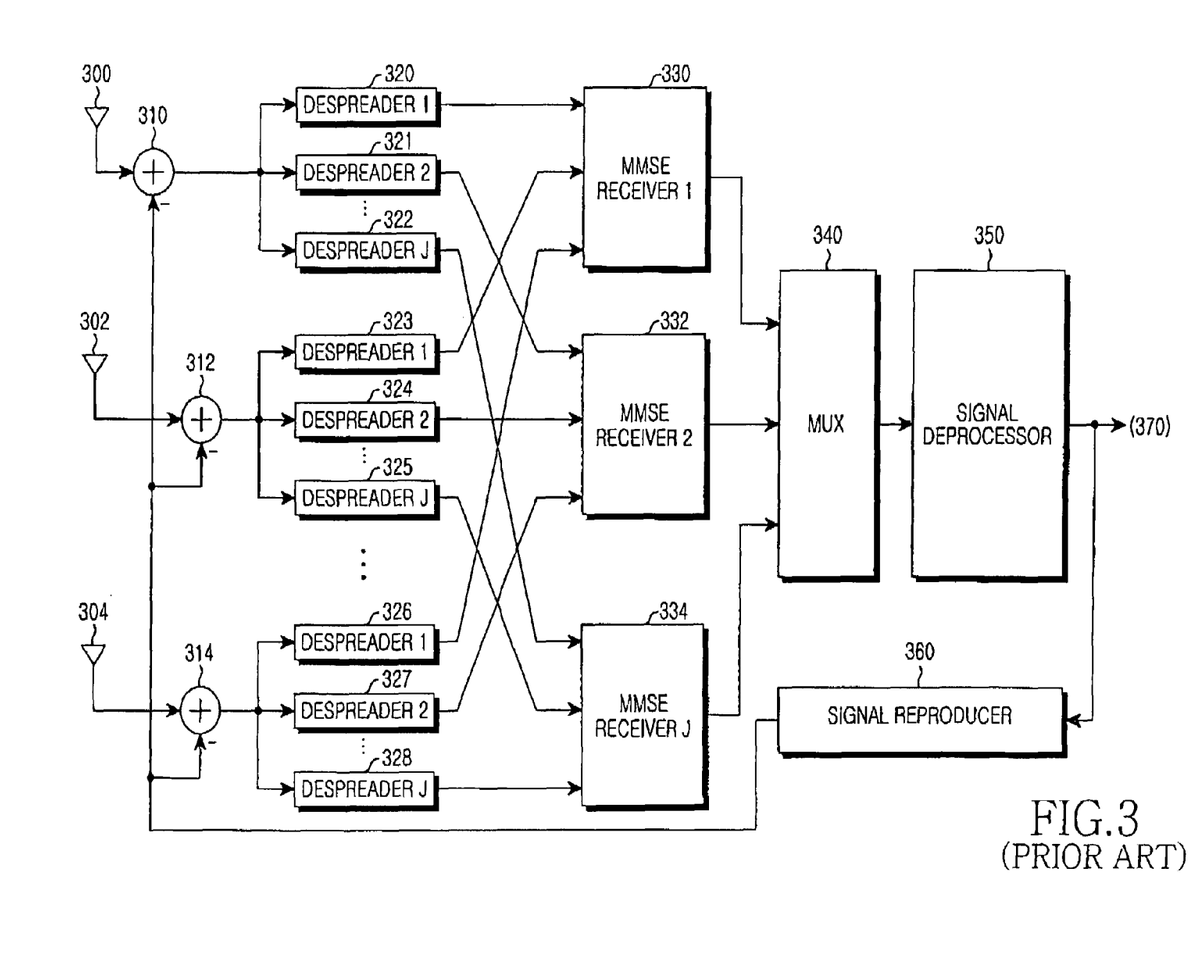
FIG. 3 is a block diagram of a receiver in the conventional MIMO mobile communication system.

FIG. 3 is a block diagram of a receiver in the MIMO system using PARC. The receiver is the counterpart of the transmitter illustrated in FIG. 2.

Referring to FIG. 3, a receive antenna 300 receives user data streams from the transmit antennas 240 to 244, a receive antenna 302 receives the user data streams from the transmit antennas 240 to 244, and a receive antenna 304 receives the user data streams from the transmit antennas 240 to 244.

The signals received at the receive antennas 300, 302 and 304 are provided to despreaders 320 to 322, despreaders 323 to 325, and despreaders 326 to 328, respectively. The despreaders 320 to 328 despread the received signals with the same spreading codes as used in the spreaders 220 to 224 of the transmitter. That is, the despreaders 320, 323, and 326 use the same spreading code as used in the spreader 220 of the transmitter. The despreaders 321, 324, and 327 use the same spreading code as used in the spreader 222. The despreaders 322, 325, and 328 use the same spreading code as used in the spreader 224.

The despread signals from the despreaders 320, 323 and 326 are provided to a Mean Minimum Square Error (MMSE) receiver 330. The despread signals from the despreaders 321, 324, and 327 are provided to an MMSE receiver 332. The despread signals from the despreaders 322, 325 and 328 are provided to an MMSE receiver 334.

Each of the MMSE receivers 330 to 334 detects user data streams according to a spreading code corresponding to MMSE receivers 330 to 334 using a predetermined rule. A multiplexer (MUX) 340 multiplexes the user data streams received from the MMSE receivers 330 to 334. A signal deprocessor 350 detects the multiplexed user data streams in a predetermined order, for example, in the order of antennas indexes and subjects them to demodulation, deinterleaving and decoding. It is assumed herein that the user data streams are detected in the order of the first to M-th transmit antennas 240 to 244. Therefore, the transmission signal of the first transmit antenna 240 is first detected.

A signal reproducer 360 processes the data stream of the first transmit antenna 240 by encoding, interleaving and modulating in the same manner as in the transmitter. Consequently, the signal estimated to be transmitted from the first transmit antenna 240 is reconstructed. Subtractors 310 to 314 subtract the reproduced signal from the signals received at the receive antennas 300 to 304 and provide the differences to the despreaders 320 to 328. The above operation is repeated up to the transmission signal from the M-th transmit antenna. Accordingly, the receiver reduces the effects of the multiple transmit antennas stepwise, while receiving the signals from the transmitter more accurately.

In the above conventional MIMO communication system, a signal from an m-th transmit antenna is estimated using an estimated signal from an (m−1)th transmit antenna. This signal estimation is called Successive Interference Cancellation (SIC). However, if errors are involved in estimation of the signal from the (m−1)th transmit antenna, the m-th transmission signal and successive signals estimated using the m-th transmission signal also have errors. Therefore, there is a need for a method of solving the problem encountered in view of the nature of SIC reception.

SUMMARY OF THE INVENTION

An object of the present invention is to substantially solve at least the above problems and/or disadvantages and to provide at least the advantages below. Accordingly, an object of the present invention is to provide an apparatus and method for reducing the effects of errors generated in a previous stage on detection of information in a current stage using information detected in the previous stage.

Another object of the present invention is to provide an apparatus and method for minimizing errors on a radio channel by efficient use of information detected in a previous stage.

A further object of the present invention is to provide a Mean Minimum Square Error (MMSE) detection apparatus and method using weights combined with Successive Interference Cancellation (SIC) in a Multi-Input Multi-Output (MIMO) mobile communication system.

The above objects are achieved by providing an apparatus and method for improving the performance of an error correction code against the effects of error waves in a MIMO communication system.

According to one aspect of the present invention, in a method of receiving a plurality of signals at a plurality of receive antennas in different paths from a plurality of transmit antennas in a mobile communication system, transmitted signals from at least two predetermined paths are estimated using signals received at each of the receive antennas using a predetermined rule. One of the estimated signals is selected according to a predetermined method and the other estimated signal is stored. Weighting values are assigned to the selected signal and a previous detected signal and the weighted signals are combined. Transmitted data is detected from the combined signal by predetermined signal deprocessing and the transmitted signal is reproduced from the detected transmitted data by predetermined signal processing. The received signals are updated by subtracting the reproduced transmitted signal from the received signals. The signal estimation step through the transmitted data detection step are repeated until transmitted data from all paths are detected from the updated received signals.

According to another aspect of the present invention, in an apparatus for receiving a plurality of signals at a plurality of receive antennas in different paths from a plurality of transmit antennas in a mobile communication system, an MMSE receiver unit estimates transmitted signals from at least two predetermined paths using signals received at each of the receive antennas using a predetermined rule. A signal deprocessor selects one of the estimated signals according to a predetermined method, stores the other estimated signal, assigns weighting values to the selected signal and a previous detected signal, combines the weighted signals, and detects transmitted data from the combined signal by predetermined signal deprocessing. A signal reproducer reproduces a transmitted signal from the detected transmitted data by predetermined signal processing. A subtractor updates the received signals by subtracting the reproduced transmitted signal from the received signals and provides the updated received signals to the MMSE receiver unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will be described herein below with reference to the accompanying drawings. In the following description, well-known functions or constructions are not described in detail for conciseness.

In a Multi-Input Multi-Output (MIMO) system disclosed herein, a transmitter transmits data using J spreading codes through M transmit antennas and a receiver receives the data through N receive antennas.

Figure 4:
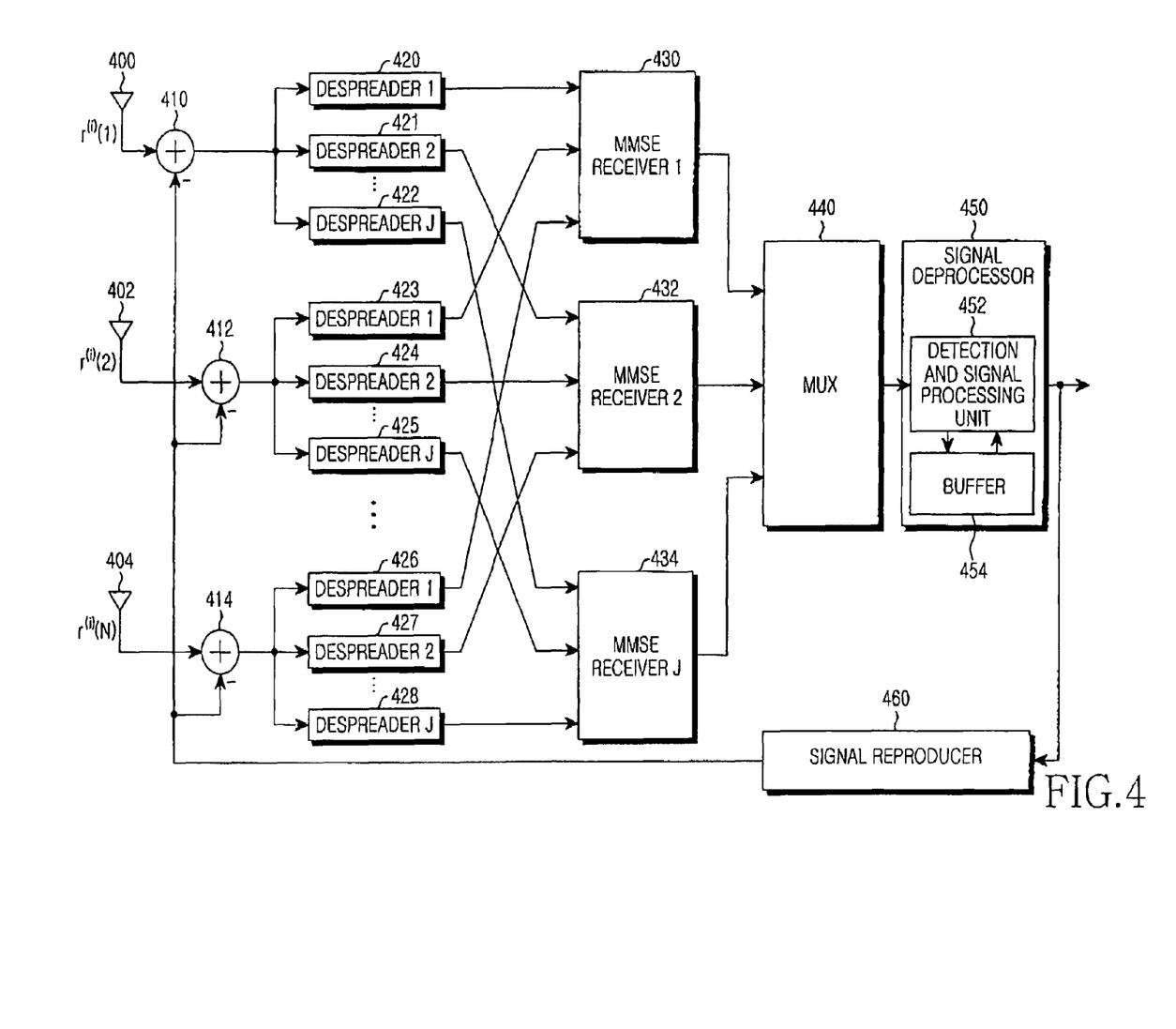
FIG. 4 is a block diagram of a Successive Interference Cancellation (SIC) receiver in a MIMO mobile communication system according to an embodiment of the present invention.

With reference to FIG. 4, the structure of an Mean Minimum Square Error-Successive Interference Cancellation (MMSE-SIC) receiver according to an embodiment of the present invention will be described. For conciseness, a detailed description of a received signal after processing in each block and of the well-known operation of each MMSE receiver will not be provided.

Referring to FIG. 4, $r^{(0)}(1)$, $r^{(0)}(2)$, ..., $r^{(0)}(N)$ denote signals received at first to N-th receive antennas 400 to 404 with none of signals from the M transmit antennas eliminated, respectively. It is clear that $r^{(0)}(n)$ is a combination of signals $s_1$ to $s_M$ that have experienced channels between the M transmit antennas 240 to 244 and the N-th receive antenna 404. $s_m$ denotes a signal transmitted from an m-th transmit antenna. Similarly, $r^{(i)}(n)$ denotes a signal received at an n-th receive antenna after an (i-1)th interference cancellation stage.

The first receive antenna 400 provides the received signal to despreaders 420 to 422, the second receive antenna 402 provides the received signal to despreaders 423 to 425, and the N-th receive antenna 404 provides the received signal to despreaders 426 to 428. The despreaders 420 to 428 use the same spreading codes as used in the spreaders 220 to 224 of the transmitter. That is, the despreaders 420, 423 and 426 use the spreading code of the spreader 220, the despreaders 421, 424 and 427 use the spreading code of the spreader 222, and the despreaders 422, 425 and 428 use the spreading code of the spreader 224.

The despread signals from the despreaders 420, 423, and 426 are fed to a first MMSE receiver 430, the despread signals from the despreaders 421, 424, and 427 are fed to a second MMSE receiver 432, and the despread signals from the despreaders 422, 425, and 428 are fed to a J-th MMSE receiver 434.

The MMSE receivers 430 to 434 detect user data streams transmitted from each of the transmit antennas in a predetermined rule. As compared to the MMSE receivers 330 to 334 illustrated in FIG. 3 that perform an MMSE operation on a desired m-th antenna, the MMSE receivers 430 to 434 estimate signals transmitted from an m-th transmit antenna and an (m+1)th transmit antenna by performing an MMSE operation regarding the m-th and (m+1)th transmit antennas. The function of the MMSE receivers 430 to 434 will be described below briefly.

A k-th signal received at the total receive antennas is expressed as $$r = \sqrt{\frac{\alpha^2}{M}} H \sum_{j=1}^{J} c(j)b(j) + n = \sqrt{\frac{\alpha^2}{M}} H \cdot s + n \qquad (1)$$

where $\alpha^2$ is a normalized value of received signal power, c(j) is a j-th spreading code, b(j) is a signal input to a j-th spreader, n is noise on the radio channel, and s=[s(1), s(2), ..., s(M)] where s(m) denotes a signal transmitted from an m-th transmit antenna. A channel matrix H represents channel characteristics between all transmit and receive antennas. The channel characteristic between the m-th transmit antenna and an n-th receive antenna is denoted by $H_{mn}$.

After despreading, the received signal r becomes $$z(j) = \qquad (2)$$
$$c^*(j)r = c^*(j)\left(\sqrt{\frac{\alpha^2}{M}} Hc(j)b(j) + n\right) = \sqrt{\frac{\alpha^2}{M}} H \cdot b(j) + n'$$

where z(j) is the signal received at the total receive antennas and despread in a j-th despreader, and c*(j) is the conjugate of a j-th spreading code. The despread signal z is a signal with a spreading code component eliminated from the transmission signal. Hence, to accurately achieve data transmitted from the transmitter, the channel component H must be removed. Therefore, an MMSE receiver unit including the MMSE receivers 430 to 434 eliminates the channel component H and computes an MMSE linear transform matrix W to minimize errors with the transmission signal using $$w = \sqrt{\frac{M}{\alpha^2}} H\left(H^*H + \frac{M}{\alpha^2}I\right)^{-1} \qquad (3)$$

W is an N×M matrix and an estimate of the total transmission signal s is computed using the matrix W by $\bar{s}$=W·-2. The estimate is provided to a MUX 440.

Here, z is an N×J matrix and z=[z(1), z(2), ..., z(J)]. The MMSE receiver unit includes as many MMSE receivers as the number J of spreading codes. A j-th MMSE receiver performs an MMSE operation on a vector z(j) of size N×1 with the M rows of a matrix W* representing the channel components between the M transmit antennas and the N receive antennas.

Let soft-decision MMSE values at an ith SIC stage be denoted by $\hat{S}(i)$. Then, the MUX 440 generates an estimated value $\hat{S}(1)$ by multiplexing received J MMSE values and outputs it to a deprocessor 450.

A detection and signal processing unit 452 in the signal deprocessor 450 measures the SINR of a signal from each transmit antenna using W and sorts the indexes of the transmit antennas in a descending order of SINR. If the antenna indexes are arranged in terms of SINR in the order of 1>2> . . . >M, the matrix $\hat{S}(1)$ is reconstructed by arranging its values in terms of SINR.

Figure 5:
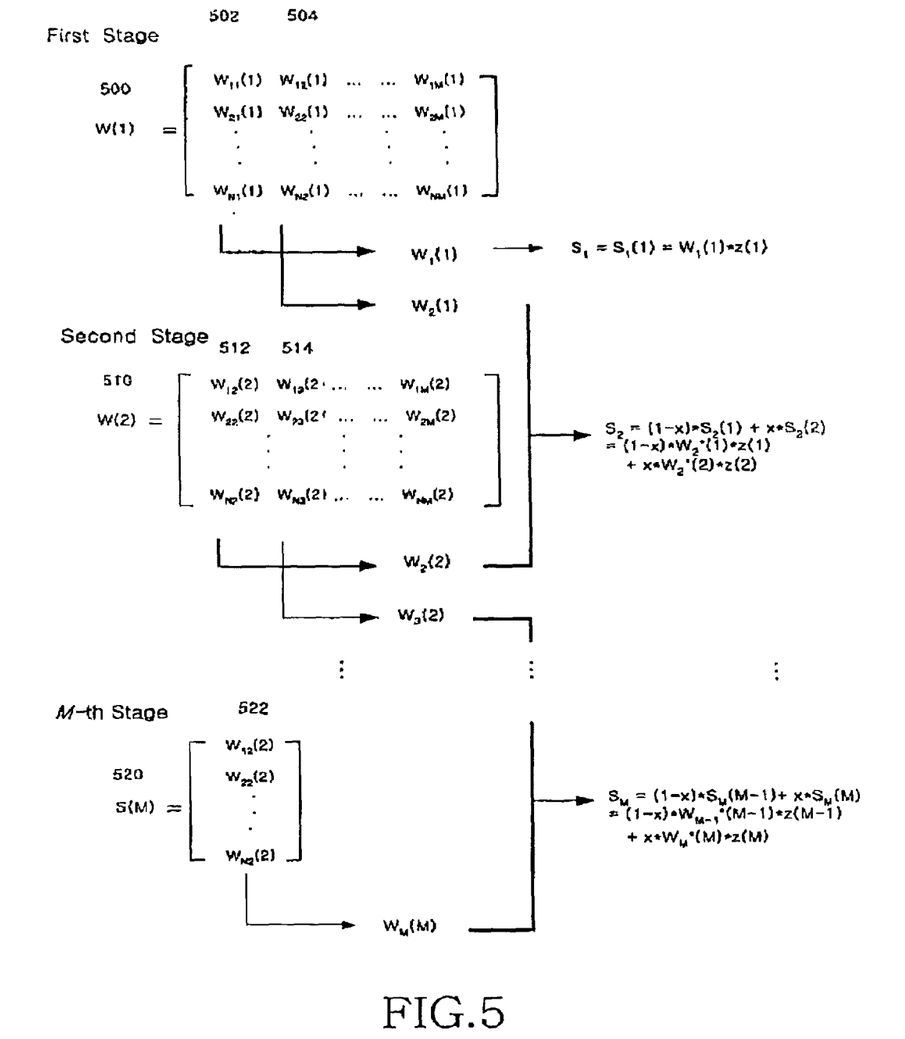
FIG. 5 illustrates examples of a reconstructed Mean Minimum Square Error (MMSE) linear transform matrix.

FIG. 5 illustrates example W(1) and W(2) of the reconstructed MMSE linear transform matrix W.

Referring to FIG. 5, SINRs are arranged by columns with respect to the transmit antennas in W(1) denoted by reference numeral 500. As noted, the SINR of a signal from the first transmit antenna is the largest, followed by that of a signal from the second transmit antenna. Hence, the detection and signal processing unit 452 detects the signal from the first transmit antenna, $\hat{S}_1(1)$ 502 using $W_1(1)$ in the first column of W(1), and the signal from the second transmit antenna, $\hat{S}_2(1)$ 504 using $W_2(1)$ in the second column of W(1). $\hat{S}_1(1)$ 502 is provided to a buffer 454. The detection and signal processing unit 452 detects a hard-decision data stream $B_1$ transmitted from the first transmit antenna by deprocessing $\hat{S}_1(1)$ 502 by demodulation, deinterleaving, and decoding, and provides it to a signal reproducer 460.

The signal reproducer 460 reproduces a signal $Y_1$ estimated to be transmitted from the first transmit antenna by encoding, interleaving and modulating $B_1$. Adders 410 to 414 subtract $Y_1$ from $r^{(1)}$ containing all receive antenna components, resulting in $r^{(2)}$.

Despreading, MMSE operation, and multiplexing are performed on $r^{(2)}$ in the same manner as $r^{(1)}$. The result $\hat{S}_1(2)$ is provided to the signal deprocessor 450. In the second SIC stage, the MMSE linear transform matrix W is reconstructed to have a size of N×(M−1) by eliminating the first column corresponding to the first transmit antenna according to the SINRS.

While FIG. 5 depicts an example of interference cancellation by computing SINRs using W(i) in an MMSE receiver according to the embodiment of the present invention, it is obvious that other equivalent measurements are available instead of SINR. SINR is computed using W(i) by $$SINR(m) = \frac{\frac{\alpha^2}{M}|w_m^* h_m|^2}{\frac{\alpha^2}{M}\sum_{k=1,k\neq m}^{M}|w_m^* h_k|^2 + w_m^* w_m} \quad (4)$$

The matrix W(2) denoted by reference numeral 510 has the SINRs of the transmit antennas arranged by columns. Since the first column $W_{n1}$ 502 corresponding to the first transmit antenna has been eliminated from W(2) and the second column $W_{n2}(2)$ 504 corresponding to the second antenna has the greatest SINR, W(2) is reconstructed such that $W_{N2}(2)$ is positioned in the first column 512 and $W_{n3}(2)$ is positioned in the second column 514.

The detection and signal processing unit 452 detects $\hat{S}_2(2)$ and $\hat{S}_3(2)$ using $W_2(2)$ and $W_3(2)$ in the first and second columns of W(2) 510 in the order of SINR. $\hat{S}_2(2)$ is combined with the buffered $\hat{S}_2(1)$ after they are weighted. The detection and signal processing unit 452 detects a hard-decision data stream $B_2$ transmitted from the second transmit antenna by deprocessing the combined signal by demodulation, deinterleaving, and decoding, and provides $\hat{S}_3(2)$ to the buffer 454. The input to the signal reproducer 460 is $$\hat{S}_2 = (1-x) \times \hat{S}_2(1) + x \times \hat{S}_2(2) \quad (5)$$

The signal reproducer 460 reproduces a signal $Y_2$ estimated to be transmitted from the first transmit antenna by encoding, interleaving and modulating $B_2$. The adders 410 to 414 subtract $Y_2$ from $r^{(2)}$, resulting in $r^{(3)}$.

The above-described operation is repeated sequentially until the signal from the transmit antenna having the least SINR is output. Hence, the signal $S_m$ from an m-th transmit antenna is $$\hat{S}_m = (1-x) \times \hat{S}_m(m-1) + x \times \hat{S}_m(m), m=2,3,\ldots,M \quad (6)$$

where m is a natural number between 2 and M.

Figure 6:
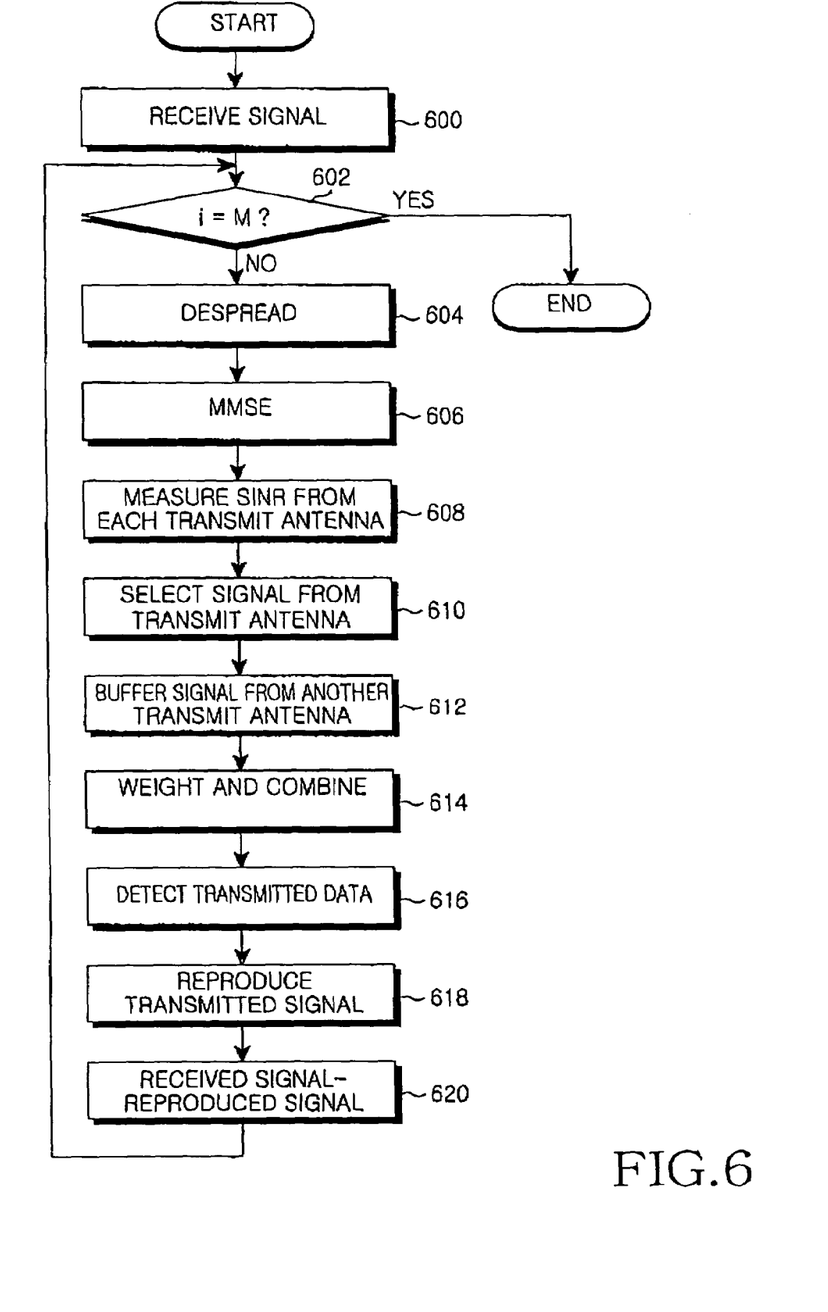
FIG. 6 is a flowchart illustrating an operation of a receiver according to the embodiment of the present invention.

FIG. 6 is a flowchart illustrating an operation of the receiver according to the embodiment of the present invention.

Referring to FIG. 6, the receiver receives signals from the transmit antennas in step 600. The receiver has N receive antennas, each receiving signals from M transmit antennas. In step 602, the receiver determines whether data has been detected completely with respect to signals transmitted from all the transmit antennas. If it has, the receiver terminates the procedure. If it has not, the receiver goes to step 604.

In step 604, the receiver despreads the signals received at the receive antennas with the same spreading codes as used in the transmitter. The number of spreading codes is J and the signal received at each of the receive antennas is despread with the first to J-th spreading codes.

The receiver performs an MMSE operation on signals despread with the same spreading code in step 606. As many MMSE receivers as the number of the spreading codes are used. That is, the MMSE operation occurs as many times as the number of the spreading codes. Therefore, an MMSE operation is performed for each of the first to J-th spreading codes.

In step 608, the receiver measures the SINRs of signals transmitted from the transmit antennas. The receiver estimates a transmit antenna that has transmitted a signal with the greatest SINR in step 610. At the same time, a transmit antenna that has transmitted a signal with the second to highest SNR is detected. In the illustrated case of FIG. 5, the transmit antennas are detected in an antenna index order, that is, in the order of 1>2> . . . >M.

The receiver temporarily stores the signal of the transmit antenna having the second to highest SNR in step 612. In step 614, the receiver weighs the signal having the highest SINR and a stored previous estimated signal with predetermined weighting values and combines them. The sum of the weight values is 1. If the SIC step is performed for the first time, there exists no stored estimated signal. Hence, the signal having the highest SINR is not weighted.

The receiver detects transmission data from the combined signal in step 616 and reproduces the signal transmitted from the transmitter by processing the detected transmission data by channel encoding, interleaving and modulation as done in the transmitter in step 618. The receiver updates the received signal by subtracting the estimated transmission signal from the received signal in step 620. The receiver repeats the above operation until data is detected for all signals from the transmit antennas.

Figure 7:
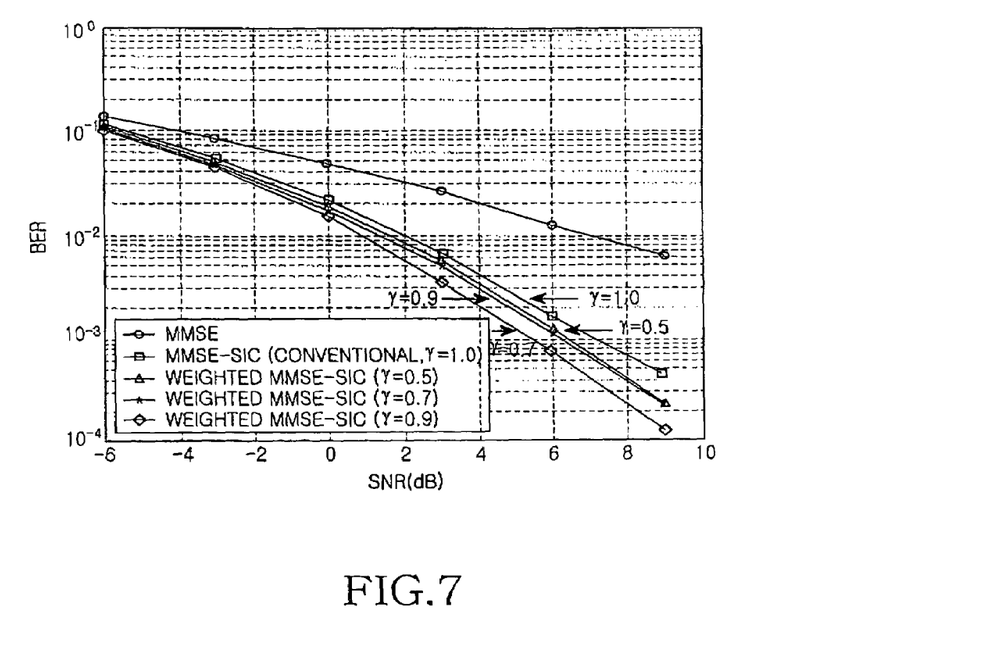
FIG. 7 is a graph comparing the embodiment of the present invention with conventional methods.
Figure 8:
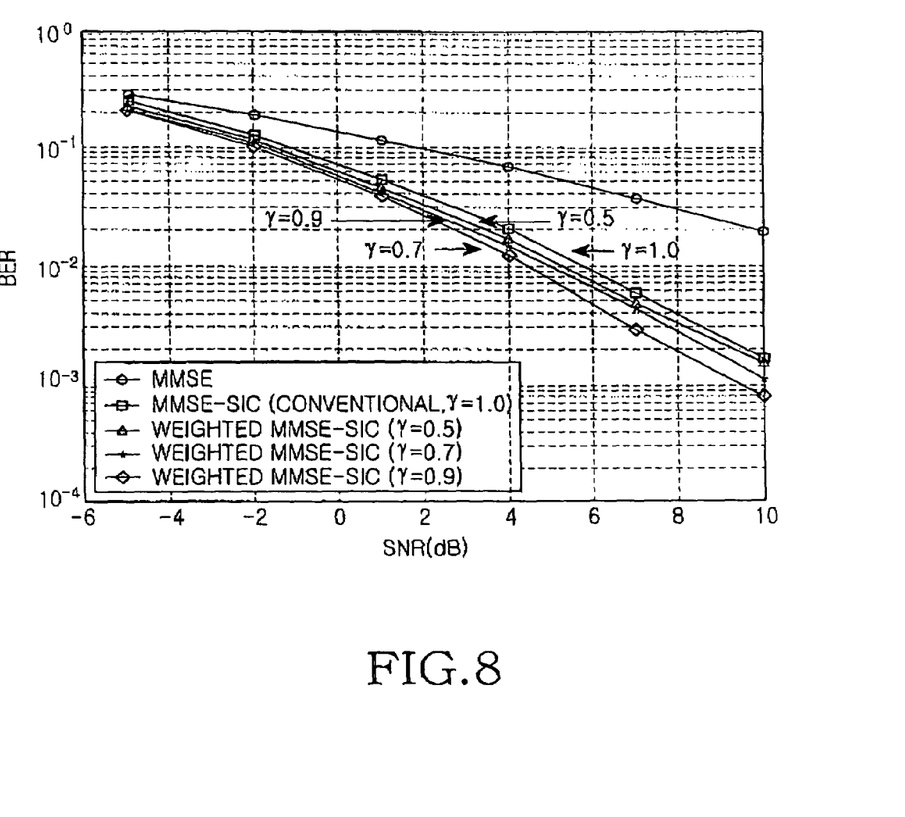
FIG. 8 is another graph comparing the embodiment of the present invention with the conventional methods.

FIGS. 7 and 8 are graphs comparing the embodiment of the present invention and conventional methods in terms of Signal to Noise (SNR) versus Bit Error Rate (BER). In the illustrated case of FIGS. 7 and 8, Binary Phase Shift Keying (BPSK) and Quaternary Phase Shift Keying (QPSK) are used, respectively. Curves are shown for MMSE, a typical MMSE-SIC with a weighting value of 1, and MMSE-SIC methods using weighting values of 0.5 0.7 and 0.9 according to the embodiment of the present invention. The graphs of FIGS. 7 and 8 reveal that the inventive MMSE-SIC methods have less BERs than the MMSE and typical MMSE-SIC. Among them, the MMSE-SIC using a weighting value of 0.7 performs best.

In accordance with the embodiment of the present invention as described above, a receiver estimates a signal transmitted from a transmitter using an estimated signal for another transmit antenna as well as an estimated signal for a current transmit antenna, thereby reducing errors and increasing reliability. Furthermore, a high-quality service can be provided to users without increasing complexity much, compared to the conventional methods.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A method of receiving a plurality of signals at a plurality of receive antennas in different paths from a plurality of transmit antennas in a mobile communication system, the method comprising the steps of:
    (1) estimating a transmitted signal from a predetermined path comprising a highest Signal to Interference and Noise Ratio (SINR) among the different paths using signals received at each of the receive antennas using a predetermined rule;
    (2) detecting transmitted data from the estimated transmitted signal by predetermined signal deprocessing;
    (3) reproducing the transmitted signal from the detected transmitted data by predetermined signal processing;
    (4) updating the received signals by subtracting the reproduced transmitted signal from the received signals; and
    (5) repeating the steps of (1) through (4) until transmitted data from all paths are detected from the updated received signals.

2. The method of claim 1, wherein different data are transmitted through the transmit antennas in the mobile communication system.

3. A method of receiving a plurality of signals at a plurality of receive antennas in different paths from a plurality of transmit antennas in a mobile communication system, the method comprising the steps of:
    (1) estimating transmitted signals from at least two predetermined paths using signals received at each of the receive antennas using a predetermined rule;
    (2) selecting one of the estimated signals according to a predetermined method and storing the other estimated signal;
    (3) assigning weighting values to the selected signal and a previous detected signal and combining the weighted signals;
    (4) detecting transmitted data from the combined signal by predetermined signal deprocessing;
    (5) reproducing the transmitted signal from the detected transmitted data by predetermined signal processing;
    (6) updating the received signals by subtracting the reproduced transmitted signal from the received signals; and
    (7) repeating the steps of (1) through (4) until transmitted data from all paths are detected from the updated received signals.

4. The method of claim 3, wherein the step of (3) comprises the step of assigning a first weighting value γ to the selected signal and a second weighting value (1-γ) to the previous detected signal.

5. The method of claim 3, wherein the step of (1) comprises the step of estimating signals from at least two paths having the highest Signal to Interference and Noise Ratio (SINR) among the plurality of paths.

6. The method of claim 3, wherein the step of (2) comprises the step of selecting a signal from a path having the highest Signal to Interference and Noise Ratio (STNR) among the plurality of paths and buffering a signal from a path having the second to highest (SINR) to be combined with a transmitted signal selected at a next stage.

7. The method of claim 3, wherein the step of (4) comprises the step of detecting the transmitted data from the selected transmitted signal by the predetermined signal deprocessing in the absence of the previous detected transmitted signal.

8. A method of receiving a plurality of signals at a plurality of receive antennas in different paths from a plurality of transmit antennas in a mobile communication system, the method comprising the steps of:
    (1) transmitting different data through the plurality of transmit antennas;
    (2) estimating transmitted signals corresponding to at least two transmit antennas using signals received at each of the receive antennas using a predetermined rule, the received signals corresponding to the data transmitted from the plurality of transmit antennas;
    (3) selecting one of the estimated signals according to a predetermined method and storing the other estimated signal;
    (4) assigning weighting values to the selected signal and a previous detected signal and combining the weighted signals;
    (5) detecting transmitted data corresponding to one of the transmit antennas from the combined signal by predetermined signal deprocessing;
    (6) reproducing a transmitted signal corresponding to the transmit antenna from the detected transmitted data by predetermined signal processing;
    (7) updating the received signals by subtracting the reproduced transmitted signal from the received signals; and
    (8) repeating the steps of (2) through (7) until transmitted data from all the transmit antennas are detected from the updated received signals.

9. The method of claim 8, wherein the step of (4) comprises the step of assigning a first weighting value γ to the selected signal and a second weighting value (1-γ) to the previous detected signal.

10. The method of claim 8, wherein the step of (2) comprises the step of estimating signals from at least two paths having the highest Signal to Interference and Noise Ratio (SINR) among the plurality of paths.

11. The method of claim 8, wherein the step of (3) comprises the step of selecting a signal from a path having the highest Signal to Interference and Noise Ratio (SINR) among the plurality of paths and buffering a signal from a path having the second to highest SINR to be combined with a transmitted signal selected at a next stage.

12. An apparatus for receiving a plurality of signals at a plurality of receive antennas in different paths from a plurality of transmit antennas in a mobile communication system, the apparatus comprising:
    a Minimum Mean Square Error (MMSE) receiver unit for estimating transmitted signals from at least two predetermined paths using signals received at each of the receive antennas using a predetermined rule;
    a signal deprocessor for selecting one of the estimated signals according to a predetermined method, storing the other estimated signal, assigning weighting values to the selected signal and a previous detected signal, combining the weighted signals, and detecting transmitted data from the combined signal by predetermined signal deprocessing;

a signal reproducer for reproducing a transmitted signal from the detected transmitted data by predetermined signal processing; and a subtractor for updating the received signals by subtracting the reproduced transmitted signal from the received signals and providing the updated received signals to the MMSE receiver unit.

13. The apparatus of claim 12, wherein the MMSE receiver unit assigns a first weighting value $\gamma$ to the selected signal and a second weighting value $(1-\gamma)$ to the previous detected signal.

14. The apparatus of claim 12, wherein the MMSE receiver unit estimates signals from at least two paths having the highest Signal to Interference and Noise Ratio (SINR) among the plurality of paths.

15. The apparatus of claim 12, wherein the MMSE receiver unit selects a signal from a path having the highest SINR among the plurality of paths and buffering a signal from a path having the second to highest SINR to be combined with a transmitted signal selected at a next stage.

16. The apparatus of claim 12, wherein the MMSE receiver unit detects the transmitted data from the selected transmitted signal by the predetermined signal deprocessing in the absence of the previous detected transmitted signal.

* * * * *